United States Patent [19]

Wildner

[11] Patent Number: 4,839,045

[45] Date of Patent: Jun. 13, 1989

[54] THERMOPLASTIC FILTER PLATE FOR A FILTER PRESS

[75] Inventor: Gerhard Wildner, Nersingen, Fed. Rep. of Germany

[73] Assignee: Lenser Verwaltungs-GmbH, Senden, Fed. Rep. of Germany

[21] Appl. No.: 88,874

[22] Filed: Aug. 24, 1987

[30] Foreign Application Priority Data

Jan. 23, 1987 [DE] Fed. Rep. of Germany ....... 3701862

[51] Int. Cl.$^4$ .............................................. B01D 25/12
[52] U.S. Cl. ..................................... 210/228; 100/211; 210/231
[58] Field of Search ....................... 100/194, 211, 295; 210/224, 225, 227, 228, 229, 230, 231

[56] References Cited

U.S. PATENT DOCUMENTS

| 4,166,035 | 8/1979 | Ramsteck | 210/231 |
| 4,397,746 | 8/1983 | Kratochvil | 210/231 |
| 4,608,164 | 8/1986 | Neu | 210/231 |

OTHER PUBLICATIONS

Grant, "Hackh's Chemical Dictionary", Fourth Edition 1969, pp. 232, 233, 527 and 574.

Primary Examiner—W. Gary Jones
Attorney, Agent, or Firm—Herbert Dubno

[57] ABSTRACT

The thermoplastic filter plate is designed for a filter press comprising a plurality of the filter plates clamped together edgewise forming a plurality of filter chambers between themselves. Each filter plate has a press wall on one or both sides of it. This press wall is at least flexible in an edge region and is movable by action of a pressurizing medium into one of the filter chambers. Each of the filter plates includes unitarily a supporting wall and a compression chamber for the pressurizing medium acting on the press wall, the supporting wall being located between adjacent compression chambers. The press wall is made in one piece with a plate frame of the filter plate. The rigid plate frame is composed of a hard plastic material resistive to the closing pressure of the filter press and the press wall is composed of an elastic plastic material guaranteeing an easy adjustability and deformability.

15 Claims, 3 Drawing Sheets

THERMOPLASTIC FILTER PLATE FOR A FILTER PRESS

FIELD OF THE INVENTION

My present invention relates to a filter plate for a filter press and, more particularly, to a thermoplastic or, more generally, a synthetic resin filter plate.

BACKGROUND OF THE INVENTION

A filter plate composed of a thermoplastic material is known for a filter press in which a plurality of these filter plates are clamped together edgewise forming a plurality of filter chambers between them.

Each of the filter plates has a press wall on one or both sides of it. This press wall is flexible and is movable by action of a pressurizing medium into one of the filter chambers. Each of the filter plates includes a supporting wall and a compression chamber for the pressurizing medium acting on the press wall, the supporting wall being located between adjacent compression chambers.

A filter plate assembled from five plate parts, comprising two plate frames, two press walls or membranes and a supporting wall, is described in German Pat. No. 34 14 550. A locking or catch device is provided for attaching the plate frame with the supporting wall on the surfaces of both parts facing each other.

The press wall formed separately from the plate frames is inserted edgewise in a clamping gap running in the circumferential direction between the supporting wall and one of the plate frames. A sealing gap directed exteriorly widened transverse to the plane of the filter plate is connected to this clamping gap at a shoulder surface opposing the clamping gap. The press wall engages with a shaped or special cross sectioned edge in this sealing gap which prevents the press wall from sliding out of the clamping gap.

This known filter plate of course allows the plate frame and the press wall to be designed in regard to their material properties according to the requirements of the filter press. Thus a very reliable operation and besides a wider range of application in regard to filtrate properties results.

However this known filter plate is very costly to manufacture and is time consuming to assemble. Furthermore, there is danger that filtration products will deposit between the elastic press wall and the plate frame in the vicinity of the clamping gap. This is particularly disturbing when filtrates of different composition are introduced in succession into the filter press. Filtration residues of a first filtration can then be carried off in a subsequent filtration.

OBJECTS OF THE INVENTION

It is an object of my invention to provide an improved filter plate for a filter press which will obviate these drawbacks.

It is also an object of my invention to provide an improved thermoplastic filter plate for a filter press which has a movable press wall with an optimum movability and which is subjected to less wear.

It is another object of my invention to provide an improved thermoplastic filter plate for a filter press having a simple structure which allows a satisfactory sealing of the filter chamber and moreover permits no gap or tear in the vicinity of the filter chamber in which filtration residues can be deposited.

SUMMARY OF THE INVENTION

These objects and others which will become more readily apparent hereinafter are attained in accordance with my invention in a thermoplastic (synthetic resin) filter plate for a filter press in which a plurality of the filter plates are clamped together edgewise forming a plurality of filter chambers between themselves.

The filter plate has a press wall on one or both sides of it. This press wall can be at least at an edge region and is movable by action of a pressurizing medium into one of the filter chambers.

Each of the filter plates includes a supporting wall and a compression chamber for the pressurizing medium acting on the press wall, the supporting wall being located between adjacent compression chambers.

According to my invention the press wall is made in one piece (unitarily) with a plate frame of the filter plate. The rigid plate frame is composed of a hard plastic (synthetic resin) material resistive to the closing pressure of the filter press and the press wall is composed of an elastic plastic material guaranteeing an easy adjustability and deformability.

The press wall is connected with the plate frame in a one piece structure so that no gaps or tears are formed in the vicinity of the connection between the plate frame and the press wall in spite of the fact that the wall and the frame are composed of different materials outside the transition zone at which the materials merge and can constitute a polymer of materials of the wall and frame.

Because of the direct attachment of both parts with each other an outstanding seal results. The plate frame has a stability of shape and strength which withstands the closing pressure of the filter press while the elastic supporting wall can follow without more the displacement pressure. Its elasticity prevents wear in the vicinity of the press wall.

In one embodiment of my invention the hard plastic material and the elastic plastic material form a copolymeric phase in a small transitional region between the plate frame and the press wall. The width of this copolymeric phase may be influenced by regulating the process used in the manufacture. Advantageously, the press wall can have at least one stiff supporting region which is formed from the hard plastic material of the plate frame.

The plate frame can be composed of acrylonitrile-butadiene-styrene copolymer, polystyrene or styrene-acrylonitrile copolymer and the press wall can be composed of acrylonitrile-butadiene rubber, styrene-butadiene rubber or chlorobutadiene rubber.

Alternatively, the plate frame can comprise acrylonitrile-butadiene-styrene copolymer or polystyrene and the press wall can be composed of acrylic rubber.

Also the plate frame can be composed of polyvinylidene fluoride and the press wall of a fluorosilicone rubber, fluoromethyl polysiloxane or fluorinated rubber.

In another alternative the plate frame can also be composed of polyethylene, polypropylene or styrene-acrylonitrile copolymer and the press wall can be composed of chlorosulfonated polyethylene.

The plate frame can moreover be composed of polyethylene or polypropylene and the press wall can be composed of ethylene-propadiene rubber or ethylene-propylene copolymer. As a final example the plate frame can be composed of polyisobutylene or polypropylene and the press wall of butyl rubber or chlorobutyl rubber.

In summary then a filter plate made of a thermoplastic material for a filter press comprises a supporting wall, a rigid plate frame made of a hard plastic material in which the supporting wall is mounted, at least one press wall formed in one piece with the plate frame of the filter plate made of an elastic plastic material which is at least partially flexible associated with and mounted on one side of the supporting wall, and at least one compression chamber for a pressurizing medium by which the press wall is movable into that compression chamber.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
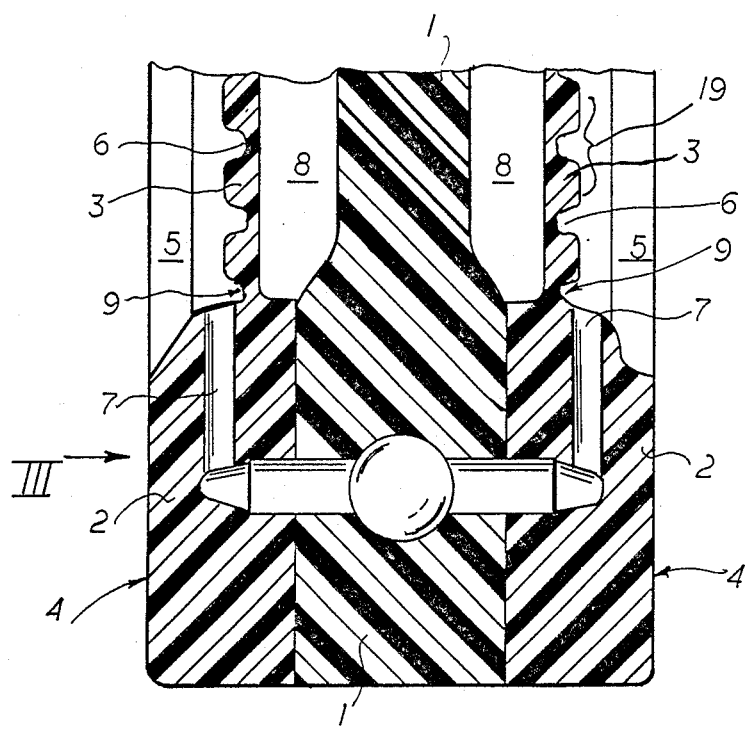
FIG. 1 is a fragmentary cross sectional view through an edge region of a filter plate according to my invention.

The filter plate shown in the drawing comprises a supporting wall 1. This supporting wall 1 is either flat or is thicker in the edge region as shown in the drawing than in its center.

The supporting wall 1 has a plate frame 2 and a flexible press wall 3 on each side of it. The filter plate is arranged in a filter press so that the plate frames 2 of neighboring filter plates contact each other with their outer front surfaces 4 with filter cloths 20 interposed between them and are clamped against each other by the closing pressure.

The filter plates thereby pairwise form a filter chamber 5 between them in which the material to be filtered arrives through an inlet which is not illustrated in the drawing.

The filtrate penetrating the filter cloth 20 arrives in a profiled section 6 and from there flows into the outlet 7.

An appropriate hydraulic or pressurizing medium is delivered to a press chamber 8 between the supporting wall 1 and the press wall 3 to effect the filter process. The press wall 3 is moved into the filter chamber 5 because of the action of the pressurizing medium and because of that puts the filter cake formed in the filter chamber under pressure.

In particular the press wall 3 is formed in one piece with the plate frame 2 and is connected to it at or near the edge region of the filter chamber 5 and/or the press chamber 8. The rigid plate frame 2 comprises a hard plastic resistive to the closing pressure of the filter press, while the press wall 3 is composed of an elastic plastic material which guarantees an easily positionable and deformable press wall.

The hard and the elastic plastic materials can form a copolymeric phase in a small transition region indicated with the reference number 9 between the plate frame 2 and the press wall 3 which has transitional properties regarding its chemical and physical variables corresponding to the properties of both different plastic materials.

The press wall 3 can also have a stiff supporting region or regions 19 which are made of the hard plastic material.

Polypropylene is suitable as the hard plastic of the plate frame. It enters into a suitable mechanical combination in the sense of my invention with the elastic plastic material of the press wall 3. This elastic plastic material can be for example ethylene-propadiene rubber, ethylene-propylene copolymer, butyl rubber or chlorobutyl rubber.

Finally the supporting wall 1 can be heat sealed with the plate frame 2 in the vicinity of their opposing surfaces, particularly when both are made from the same thermoplastic material.

A pressing process in which the already manufactured plate frame is put in the compression mold and the elastic plastic material is delivered to the compression mold in approximately granular form has been used for making the plate frame 2 with the press wall 3.

The granulate is compressed with the plate frame in the subsequent compression process while being heated. Time and temperature during the heating determines the width of the transitional region 9 of the copolymeric phase.

Figure 2:
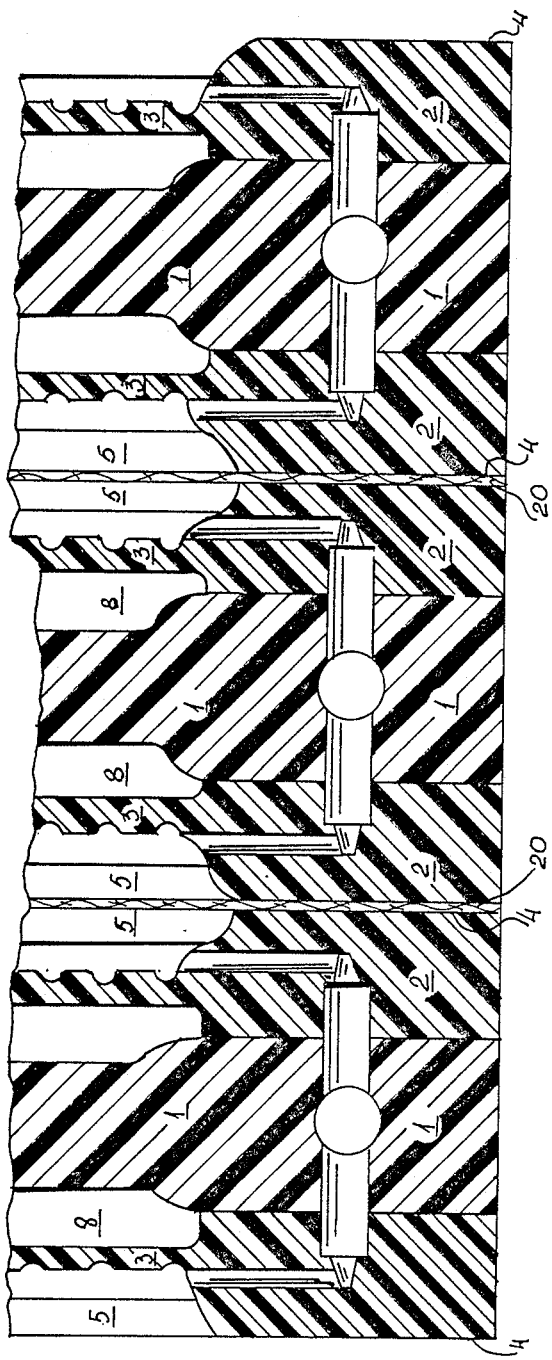
FIG. 2 is a cross sectional view of three filter plate units according to FIG. 1 assembled in a filter press.
Figure 3:
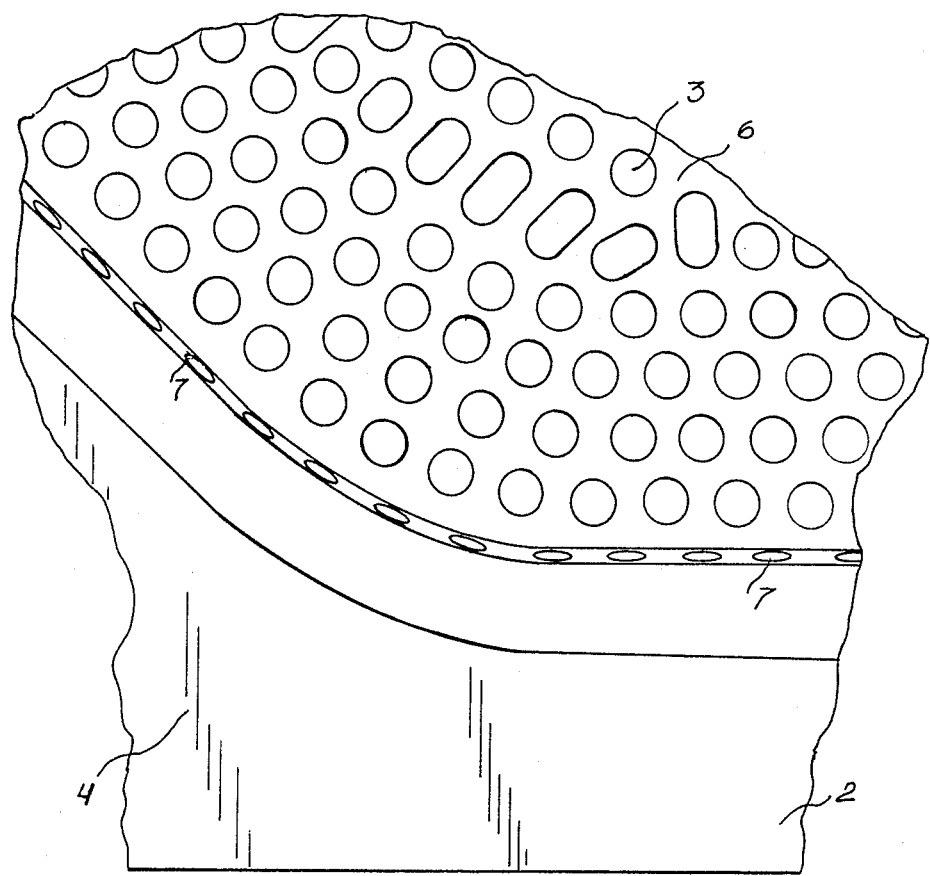
FIG. 3 is a fragmentary elevation in the direction of arrow III in FIG. 1.

By definition the filter plate includes the supporting wall 1, the plate frame 2 and the press wall or walls 3. Individual units each including a single filter plate are assembled into a complete filter press with three units as shown in the example of FIG. 2. These units are approximately circular in cross section and are assembled with their opposing faces contacting and their edges adjacent each other in the completed filter press.

I claim:

1. In a filter plate made of a thermoplastic material for a filter press in which a plurality of said filter plates are clamped together edgewise forming a plurality of filter chambers between themselves, said filter plate having a press wall on one or both side thereof which is at least flexible in an edge region and which is movable by action of a pressurizing medium into one of said filter chambers, each of said filter plates including a supporting wall and a compression chamber for said pressurizing medium acting on said press wall, said supporting wall being located between adjacent ones of said compression chambers, the improvement wherein said press wall is made in one piece with a plate frame of said filter plate, said plate frame being rigid and composed of a hard plastic material resistive to the closing pressure of said filter press and said press wall being composed of an elastic plastic material different from said hard plastic material and permitting said press wall to flex relative to said frame.

2. The improvement defined in claim 1 wherein said hard plastic material and said elastic plastic material form a copolymer phase in a small transitional region between said plate frame and said press wall.

3. The improvement defined in claim 1 wherein said press wall has at least one stiff supporting region which is formed of said hard plastic material.

4. The improvement defined in claim 1 wherein said plate frame is composed of acrylonitrile-butadiene-styrene copolymer, polystyrene or styrene-acrylonitrile copolymer and said press wall is composed of acrylonitrile-butadiene rubber, styrene-butadiene rubber or chlorobutadiene rubber.

5. The improvement defined in claim 1 wherein said plate frame comprises acrylonitrile-butadiene-styrene copolymer or polystyrene and said press wall is composed of acrylic rubber.

6. The improvement defined in claim 1 wherein said plate frame is composed of polyvinylidene fluoride and said press wall is composed of fluorosilicone rubber, fluoromethyl polysiloxane or fluorinated rubber.

7. The improvement defined in claim 1 wherein said plate frame is composed of polyethylene, polypropylene or styrene-acrylonitrile copolymer and said press wall is composed of chlorosulfonated polyethylene.

8. The improvement defined in claim 1 wherein said plate frame is composed of polyethylene or polypropylene and said press wall is composed of ethylene-propadiene rubber or ethylene-propylene copolymer.

9. The improvement defined in claim 1 wherein said plate frame is composed of polyisobutylene or polypropylene and said press wall is composed of butyl rubber or chlorobutyl rubber.

10. In a filter plate made of a thermoplastic material for a filter press comprising a supporting wall, a plate frame in which said supporting wall is mounted, at least one press wall which is at least partially flexible mounted on one side of said supporting wall, a compression chamber for a pressurizing medium by which said press wall is movable into said compression chamber, the improvement wherein said press wall is made in one piece with said plate frame of said filter plate, said plate frame being rigid and composed of a hard plastic material resistive to the closing pressure of said filter press in which said filter plate is mounted and said press wall being composed of an elastic plastic material different from said hard plastic material and which guarantees an easy positionability and deformability, said hard plastic material and said elastic plastic material forming a copolymeric phase in a small transitional region between said plate frame and said press wall.

11. A filter plate made of a thermoplastic material for a filter press comprising:

a supporting wall;
a rigid plate frame made of a hard plastic material in which said supporting wall is mounted;
at least one press wall formed in one piece with said plate frame of said filter plate and made of an elastic plastic material different from said hard plastic material and which is at least partially flexible mounted on one side of said supporting wall; and
at least one compression chamber for a pressurizing medium by which said press wall is movable into said compression chamber.

12. A filter plate defined in claim 11 wherein said hard plastic material is acrylonitrile-butadiene-styrene copolymer, polystyrene or styrene-acrylonitrile copolymer 13. A filter plate defined in claim 12 wherein said elastic plastic material is acrylonitrile-butadiene rubber, styrene-butadiene rubber or chlorobutadiene rubber.

14. A filter plate defined in claim 11 wherein said plate frame is made of polyvinylidene fluoride and said press wall is made of fluorosilicone rubber, fluoromethyl polysiloxane or fluorinated rubber.

15. A 3-part membrane filter assembly for a filter press, comprising:

a pair of filter plates flanking a support wall, each of said filter plates being composed of synthetic resin and defining with said support wall a pressurizable chamber adapted to receive a pressurizing medium, each of said filter plates being formed in one piece with a frame of hard plastic material,
an easily deformable central portion formed from an elastic synthetic resin constituting a material different from that of the respective frame, and
a narrow transition region between said central portion and the respective frame, said central portion being deformed upon the supply of pressure medium to the respective chamber.

* * * * *